Aug. 3, 1965 J. M. BAKSHI 3,199,094

PLURAL CHANNEL RECORDING SYSTEM

Filed Oct. 8, 1962 2 Sheets-Sheet 1

INVENTOR.
JOGINDRA M. BAKSHI
BY
Christie, Parker & Hale
ATTORNEYS.

Aug. 3, 1965 J. M. BAKSHI 3,199,094

PLURAL CHANNEL RECORDING SYSTEM

Filed Oct. 8, 1962 2 Sheets-Sheet 2

INVENTOR.
JOGINDRA M. BAKSHI
BY
Christie Parker & Hale
ATTORNEYS.

3,199,094
Patented Aug. 3, 1965

3,199,094

PLURAL CHANNEL RECORDING SYSTEM

Jogindra M. Bakshi, Pasadena, Calif., assignor to Burroughs Corporation, Detroit, Mich., a corporation of Michigan Filed Oct. 8, 1962, Ser. No. 229,037
5 Claims. (Cl. 340—174.1)

Figure 1:
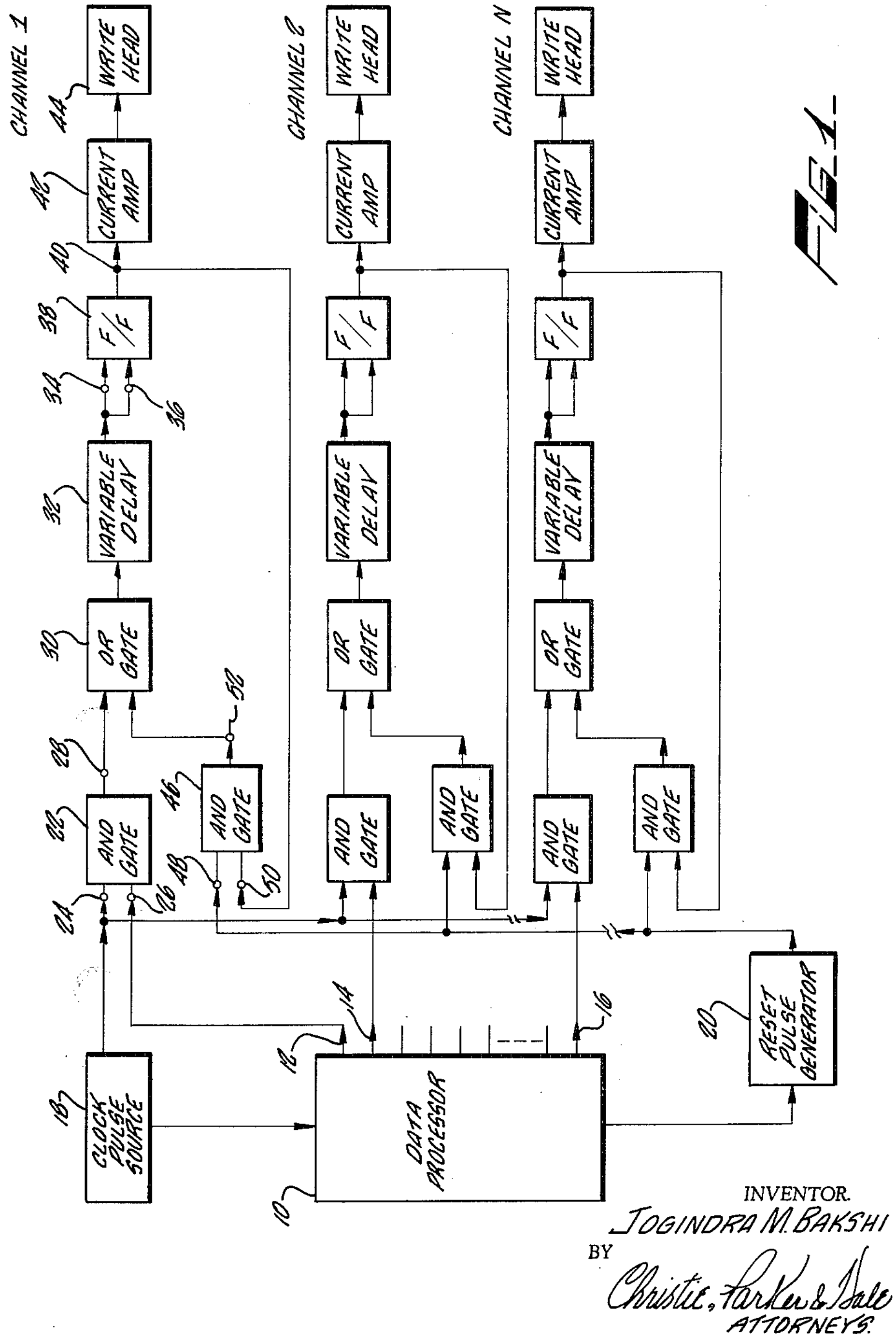

This invention relates to recording systems, and, more particularly, to a system for simultaneously recording bits of coded digital information in parallel in a plurality of recording channels.

It is common in many electronic computer systems to process large numbers of binary coded information signals simultaneously and in parallel. A common step in the processing of digital information in such systems is the feeding of bits of binary coded information in parallel through a plurality of information carrying channels for simultaneous recording in a plurality of recording channels. In general the recording channels comprise physically parallel magnetic magnetic recording tracks such as those appearing on magnetic tape, drums, and the like. In addition to a recording track each recording channel includes a recording device such as a magnetic head, and logical circuitry having a switching element such as a conventional flip-flop for driving the magnetic head to record binary coded information signals on the recording track.

In such systems each parallel group of binary coded information bits is applied simultaneously to the plurality of recording channels to form a binary coded character of a word to be recorded. To read the coded word or words formed from a series of recorded binary coded characters, accurately aligned means are provided for simultaneously reading the bits of coded information in parallel from the recording tracks. The information read from the recording tracks is gated in parallel at predetermined times and only for short time durations to other parallel circuitry for processing.

Thus, to provide an accurate gating of each character in a word to the parallel circuitry it is necessary that the parallel binary coded bits comprising each character be recorded simultaneously on the recording tracks and that the gating of the characters be synchronized with the simultaneous writing thereof. In an attempt to provide simultaneous and parallel recording of bits of binary coded information, the magnetic heads are generally aligned in a row across and normal to the parallel arranged recording tracks. Bits of digital information received in parallel by the logical circuits are then written into an aligned recording position across the parallel tracks by the magnetic heads to form a binary coded character.

In practice, however, misalignment in the magnetic gaps of the magnetic heads, misalignment of assembly of the magnetic heads with respect to medium, and variations in the electrical components comprising the logical circuitry in each recording channel introduce physical displacement between the bits as recorded in parallel in a recording position, thereby causing possible misreadings of the binary coded characters as recorded. Accordingly, in addition to aligning the magnetic heads, variable delay networks are included in each recording channel to compensate for the physical displacement of the bits in each recording position. Having provided such compensation the bits of digital information forming each character are recorded simultaneously and in parallel on the recording tracks thereby providing for the accurate gating and processing of each parallel recorded character.

Although there are several ways in which digital information may be magnetically recorded, the common methods in general use today in high speed digital recording systems are conventional and modified "non-return to zero" type of recording commonly termed NRZ and NRZ–1 recording. Non-return to zero type of recording has the advantage over other recording schemes of allowing a greater density of bits of digital information to be recorded on the magnetic recording tracks.

Briefly, in NRZ recording the logical circuitry for each channel is arranged to switch its associated flip-flop only when the binary coded information to be recorded changes value. Thus, when a series of binary ones are to be written on a recording track, the flip-flop stays in the predetermined state until a binary zero is to be written at which time the flip-flop changes state. In NRZ–1 recording, the logical circuitry for each channel is arranged to switch its associated flip-flop each time a bit of digital information of a predetermined binary value is to be written on the recording track. For example, when a series of binary ones is to be written on the recording track the flip-flop switches between its stable states to write a series of binary ones in consecutive recording positions and does not switch states to write a binary zero.

Due to the logically controlled switching of the flip-flops, in non-return to zero type recording, it is necessary at the end of each word or series of characters to reset all flip-flops to a common state and to develop a parity check character to provide an indication of recording errors in the information as written on the recording track. In conventional recording systems the resetting of the flip-flops is in response to wide reset pulse applied directly to the flip-flop of each recording channel. The reset pulse functions to bring all flip-flops to a common state and causes the bit to be written on each recording track to form a parity check character.

The parity check bits as written on the recording tracks are read and gated for processing in the same manner as described for the characters of digital information. Thus, due to the variable circuit delays among the recording channels, misalignment occurs between the bits of the parity check character recorded on the recording tracks which may result in inaccuracies in the processing of the parallel recorded parity check character. Such misalignment among the bits of the parity check character may be compensated for by additional variable delay networks in the circuitry receiving the reset pulses for application to the flip-flops. This solution is expensive, however, and requires additional circuit hardware for each channel.

In view of this, and in contrast to the conventional method of resetting all flip-flops and writing parity check characters, the present invention provides an arrangement which makes use of the variable delay networks already existing in each recording channel to provide compensation for misalignment of bits of the parity check characters as recorded on the recording tracks. To accomplish this, means are included in each recording channel for developing a control signal in response to a predetermined state of the flip-flop for the channel and a reset pulse applied to each channel. The control signal is applied to the variable delay network of the channel, delayed thereby, and applied to the flip-flop to cause the flip-flop to switch to its other stable state and the write head to write a bit of a check character on the recording track associated therewith.

Thus, by employing the present invention all flip-flops are switched to a common state and a plurality of check bits are simultaneously recorded on the recording tracks to provide indications of any recording errors which may have occurred in the simultaneous and parallel recording of the binary coded bits of digital word information.

Figure 2:
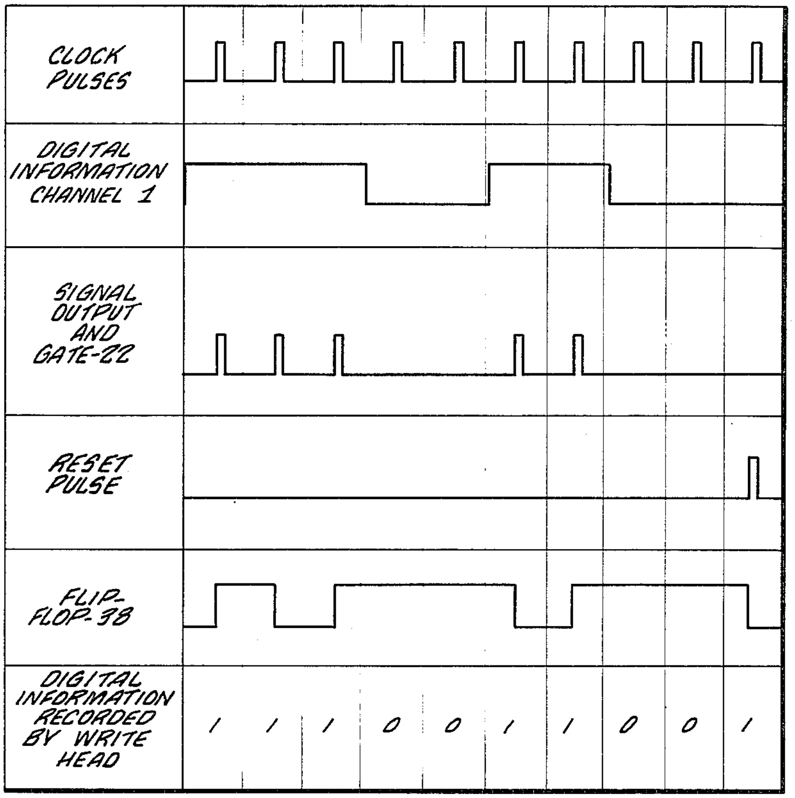

The above as well as other features of the present invention may be more clearly understood by reference to the following detailed description when considered with the drawings, in which:

FIGURE 1 is a block diagram representation of a recording system employing the present invention; and FIGURE 2 is a chart representing the waveforms of the electrical signals processed and developed in the recording system illustrated in FIGURE 1.

The recording system illustrated in FIGURE 1 includes a data processor 10 for transmitting binary coded digital information simultaneously and in parallel for recording and processing in a plurality of recording channels as previously described. Three of the recording channels are illustrated as channels 1, 2 and N.

The data processor 10 includes a plurality of output leads, one associated with each recording channel. For example, output leads designated as 12, 14 and 16 are associated with the channels 1, 2 and N, respectively.

The operation of the data processor 10 is under the timed control of clock pulses generated by a clock pulse source 18 which may comprise a separate element as illustrated or form an integral part of the data processor 10. The clock pulses generated by the source 18 synchronize the transmission of digital information signals on all output leads to the plurality of recording channels such that the digital information signals are transmitted simultaneously and in parallel to the recording channels.

Also controlled from the clock pulse source 18 through the data processor 10 is a reset pulse generator 20. The reset pulse generator 20 is arranged to generate reset pulses at predetermined time intervals in the series of the clock pulses generated by the clock pulse source 18; for example, the reset pulse generator 20 may include a counter for receiving the clock pulses and a one-shot multivibrator connected to a particular stage of the counter to generate a reset pulse in response to a predetermined number of clock pulses corresponding to the number of characters in a word. As represented, the reset pulses are applied in common to each recording channel.

Although not specifically shown, the plurality of recording channels include a plurality of magnetic recording tracks, one associated with each channel. Preferably, the recording tracks are physically parallel to each other such as those associated with magnetic recording tape, drums, and the like.

In addition to the recording tracks each channel includes a recording means such as the magnetic write head 44 illustrated for the channel 1 in FIGURE 1.

In order to provide simultaneous recording of bits of digital information in the parallel recording channels, the magnetic write heads are physically aligned across the recording tracks as illustrated by the vertical alignment of the write head in FIGURE 1.

To record bits of digital information on each recording track, the recording channels each include logical circuitry connecting an output lead of the data processor 10 to a magnetic write head. As represented, the logical circuitry in each recording channel is substantially the same. Accordingly, only the logical circuitry of channel 1 will be described in detail, a similar structural arrangement and operation occurring in each of the remaining recording channels to provide simultaneous and parallel recording of binary coded bits of character forming digital information.

As illustrated, channel 1 includes an AND gate 22 having a pair of input terminals 24 and 26 and an output terminal 28. The AND gate 22 receives clock pulses from the clock pulse source 18 at the input terminal 24 and a binary coded digital information signal generated on the output lead 12 at the input terminal 26. The waveforms of the clock pulses and the digital information signal applied to the AND gate 22 are as illustrated in the first two rows of the chart of FIGURE 2.

The AND gate 22 is arranged to pass bits of digital information to its output terminal 28 upon coincident receipt of a binary coded digital information signal of a predetermined polarity and a clock pulse. The bits of digital information passed by the AND gate 22 are illustrated by the waveform in the third row of the chart of FIGURE 2 and each comprise one bit of a binary coded character formed from a parallel group of bits simultaneously passed by the AND gates in each recording channel.

Coupled to the output terminal 28 of the AND gate 22 is an OR gate 30. The OR gate 30 is arranged to pass the bits of digital information gated by the AND gate to a variable delay network 32. The variable delay 32 functions to provide means for compensating for misalignment of channel 1 relative to the other channels and may comprise a variable delay line or circuit having a variable delay time such as a multivibrator including a controllable timing circuit.

The bits of digital information passed by the variable delay 32 are applied simultaneously to the input terminals 34 and 36 of a switching element illustrated in block form as a flip-flop 38. The flip-flop 38 is arranged to switch between first and second stable states in response to input pulses of a predetermined polarity applied at the input terminals 34 and 36. The flip-flop 38 includes an output terminal 40 which is alternately energized to a relatively positive and relatively negative voltage as the flip-flop 38 switches between its first and second stable states. For example, when the flip-flop 38 is in its first stable state a relatively positive signal is developed at the output terminal 40 while when the flip-flop 38 is in its second stable state the output signal is of a relatively negative polarity.

The output signal developed by the flip-flop 38 is amplified by a current amplifier 42 and applied to the write head 44 which writes a bit of digital information on an associated recording track (not shown) in response to the output signal.

The logical circuit associated with each channel of the recording system as described is arranged for NRZ–1 recording. Thus, as illustrated in Row 5 of the chart of FIGURE 2, the flip-flop 42 is energized to switch between its stable states in response to each bit of digital information of a predetermined binary value passed by the AND gate 22, in this case a binary one.

Due to this logical switching arrangement it is necessary at the end of each word of digital information to reset all flip-flops in the recording system to a common state and to generate a parity check pulse to provide an indication of possible recording errors.

In order to provide such a resetting of the flip-flops, and in accordance with the present invention, each recording channel includes an AND gate 46. The AND gate 46 includes a pair of input terminals 48 and 50 and an output terminal 52. The AND gate 46 receives reset pulses from the reset pulse generator 20 at the input terminal 48 and the output signals of the flip-flop 38 at the input terminal 50. The AND gate 46 is arranged to pass a pulse signal of the predetermined polarity to the output terminal 52 when the flip-flop 38 is in its first stable state and a reset pulse is applied to the input terminal 48. The pulse signal passed by the AND gate 46 is applied to the OR gate 30 and passed through the variable delay 32 to the flip-flop 38. The pulse signal, being of the predetermined polarity, triggers the flip-flop 38 to switch to its second stable state to cause the write head 44 to write a bit of a check character on the associated recording track.

Thus, without requiring additional delay networks the apparatus of the present invention provides means for bringing all flip-flops to a common state and for writing a check bit on each recording track which is exactly aligned with the check bit written on each other recording track to form an aligned parity check character.

What is claimed is:

1. In a system for simultaneously transmitting bits of digital information in a plurality of information carrying channels, each channel comprising:

gating means receiving a digital information signal and a series of clock pulses for passing bits of the digital information signal upon the coincident receipt of the digital information signal and the clock pulses;

delay means coupled to receive the bits of digital information passed by the gating means;

switching means coupled to the delay means for switching between first and second stable states to develop output signals of different magnitudes in response to bits of digital information of a predetermined polarity;

and means responsive to the first state of the switching means and a reset pulse applied simultaneously to each channel for applying a signal of the predetermined polarity to the delay means to cause the switching means to switch to its second state.

2. In a system for simultaneously recording bits of digital information in parallel on a plurality of recording tracks, including a plurality of information handling channels, each channel being associated with a different recording track and each comprising:

gating means for receiving a digital information signal and a series of clock signals for passing bits of the digital information signal upon the coincident receipt of the digital information signal and the clock signals;

delay means coupled to receive bits of digital information passed by the gating means;

switching means coupled to the delay means for switching between first and second stable states to develop output signals of different magnitude in response to bits of digital information of a predetermined polarity;

recording means for recording bits of digital information on an associated recording track in response to the output signals developed by the switching means;

and means responsive to the first state of the switching means and a reset pulse applied simultaneously to each channel for applying a pulse signal of the predetermined polarity to the delay means to cause the switching means to switch to its second state.

3. A system for simultaneously transmitting bits of digital information in a plurality of information carrying channels, comprising:

a source of digital information signals for each information carrying channel;

a pulse source for generating a series of clock pulses;

a source of reset pulses for generating a reset pulse at predetermined times during the series of clock pulses;

and a plurality of information carrying channels each including means receiving a digital information signal from an associated source of digital information signals and clock pulses from the pulse source for passing bits of the digital information signal upon the coincident receipt of the digital information signal and the clock pulses, delay means coupled to receive the bits of digital information passed by the gating means, switching means coupled to the delay means for switching between first and second stable states to develop output signals of different magnitude in response to bits of digital information of a predetermined polarity, and means responsive to the first state of the switching means and a reset pulse for applying a signal of the predetermined polarity to the delay means to cause the switching means to switch to its second state.

4. A system for simultaneously recording bits of digital information in parallel on a plurality of recording tracks, comprising:

a source of digital information signals for each recording track;

a pulse source for generating a series of clock pulses;

a source of reset pulses for generating reset pulses at predetermined time intervals in the series of clock pulses;

and a plurality of information handling channels each channel being associated with a different recording track and each including means receiving the clock pulses and a digital information signal for passing a bit of the digital information signal upon the coincident receipt of the digital information signal and a clock pulse;

delay means coupled to receive the bits of digital information passed by the gating means, switching means coupled to the delay means for switching between first and second stable states to develop output signals of different magnitude in response to bits of digital information of a predetermined polarity, recording means for recording bits of digital information on the recording track in response to the output signals developed by the switching means, and means responsive to the first stable state of the switching means and a reset pulse from the source of reset pulses for applying a signal of the predetermined polarity to the delay means to cause the switching means to switch to its second state.

5. In a system for simultaneously transmitting information bits in synchronism with a source of clock pulses to the outputs of a plurality of separate channels in response to a binary input information signal in each channel in the form of two distinct voltage levels representing the two binary digits, the combination comprising in each channel:

first gating means receiving the digital information signal and a series of clock pulses from said source for passing output pulses representing bits of the digital information signal upon the coincident receipt of one level of the digital information signal and the clock pulses;

switching means for switching between first and second stable states to develop output signals of different magnitudes in response to successive input pulses of digital information;

second gating means responsive to the first state of the switching means and a reset pulse applied simultaneously to the second gating means in each channel for generating a reset pulse signal;

and means including a variable delay circuit for coupling the output pulses of the first and second gating means to the input of the switching means, whereby the switching means in the several channels can be operated in the same time relation in response to either digital information pulses or to reset pulses.

References Cited by the Examiner

UNITED STATES PATENTS

| | | | |
|---|---|---|---|
| 2,807,003 | 9/57 | Alrich | 340—174.1 |
| 2,807,004 | 9/57 | Pouliart et al. | 340—174.1 |
| 2,819,940 | 1/58 | Sorrells | 340—174.1 |
| 3,001,140 | 9/61 | Beck | 340—174.1 X |

IRVING L. SRAGOW, *Primary Examiner.*